(12) United States Patent
Hsiao

(10) Patent No.: US 6,848,937 B1
(45) Date of Patent: Feb. 1, 2005

(54) RETRACTABLE EXTENSION CORD HOUSING HAVING A LOW-PROFILE PLUG HOLDER

(76) Inventor: Feng-Shen Hsiao, 10th Fl., No. 5, Sec. 1, Tun Hua S. Rd., Taipei (TW)

(*) Notice: Subject to any disclaimer, the term of this patent is extended or adjusted under 35 U.S.C. 154(b) by 0 days.

(21) Appl. No.: 10/657,239

(22) Filed: Sep. 9, 2003

(51) Int. Cl.[7] ............................................. H01R 13/60
(52) U.S. Cl. ................................... 439/528; 439/501
(58) Field of Search .......................... 439/528, 501, 439/538, 162, 638; 191/12.4, 12.2

(56) References Cited

U.S. PATENT DOCUMENTS

| | | | |
|---|---|---|---|
| 6,574,120 B1 * | 6/2003 | Chou | 361/819 |
| 6,623,294 B2 * | 9/2003 | Tse et al. | 439/501 |
| D485,744 S * | 1/2004 | Khubani | D13/153 |
| 6,725,986 B2 * | 4/2004 | Reindle et al. | 191/12.2 A |
| 6,733,328 B2 * | 5/2004 | Lin et al. | 439/501 |
| 2002/0061678 A1 * | 5/2002 | Archambault | 439/501 |

* cited by examiner

Primary Examiner—J. F. Duverne
(74) Attorney, Agent, or Firm—Rabin & Berdo, P.C.

(57) ABSTRACT

A retractable extension cord housing with a low-profile plug holder retractably houses an extension cord in a hollow body and has an external surface. The plug holder comprises a plug recess, a cord groove and an optional retaining tab. The plug recess and cord groove are formed in the external surface to hold a low-profile plug and a section of the extension cord attached to the low-profile plug. Therefore, the entire retractable extension cord housing has an appearance that is neat and clean.

4 Claims, 2 Drawing Sheets

RETRACTABLE EXTENSION CORD HOUSING HAVING A LOW-PROFILE PLUG HOLDER

BACKGROUND OF THE INVENTION

1. Field of the Invention

The present invention relates to a retractable extension cord housing, and more particularly to a retractable extension cord housing having a low-profile plug holder to make the retractable extension cord housing neat and conveniently hold and protect the plug for storage.

2. Description of Related Art

Extension cords are widely used in many applications in daily life. Long extension cords are often mounted in a retractable extension cord housing so the unnecessary part of the extension cord is retracted and held in the retractable extension cord housing. The extension cord except for the plug is retracted into the retractable extension cord housing. The exposed plug makes the housing appear unsightly and messy and allows the plug to be damaged. To overcome the situation and make the housing tidy, various kinds of extension cord housings have a feature to the hold the plug outside.

Such conventional features consists of pulling the extension cord taut into the housing so only the plug is exposed. However, the entire housing is still unsightly unless the plug is hidden. Another method to hold the plug consists of defining a notch in the housing to hold a portion of the extension cord adjacent the plug in the notch to hold the plug. However, the aforementioned problem is still not solved.

To overcome the shortcomings, the present invention provides a retractable extension cord housing with a low-profile plug holder that can hold and hide a low-profile plug connected to the extension cord to mitigate or obviate the aforementioned problems.

SUMMARY OF THE INVENTION

The main objective of the invention is to provide a retractable extension cord housing with a low-profile plug holder that can hold and hide a low-profile plug connected to an extension cord that is retractably held to the retractable extension cord housing such that the retractable extension cord housing as a whole appears neat and clean.

To achieve the aforesaid objectives, a retractable extension cord housing with a low-profile plug holder in accordance with the present invention comprises a hollow body, an extension cord and a plug holder.

The plug holder comprises a plug recess, a cord groove and optionally a retaining tab and is to hold a low-profile plug and a segment of an extension cord attached to the low-profile plug. Therefore, the entire retractable extension cord housing appears neat and clean.

Other objectives, advantages and novel features of the invention will become more apparent from the following detailed description when taken in conjunction with the accompanying drawings.

DETAILED DESCRIPTION OF PREFERRED EMBODIMENT

Figure 1:
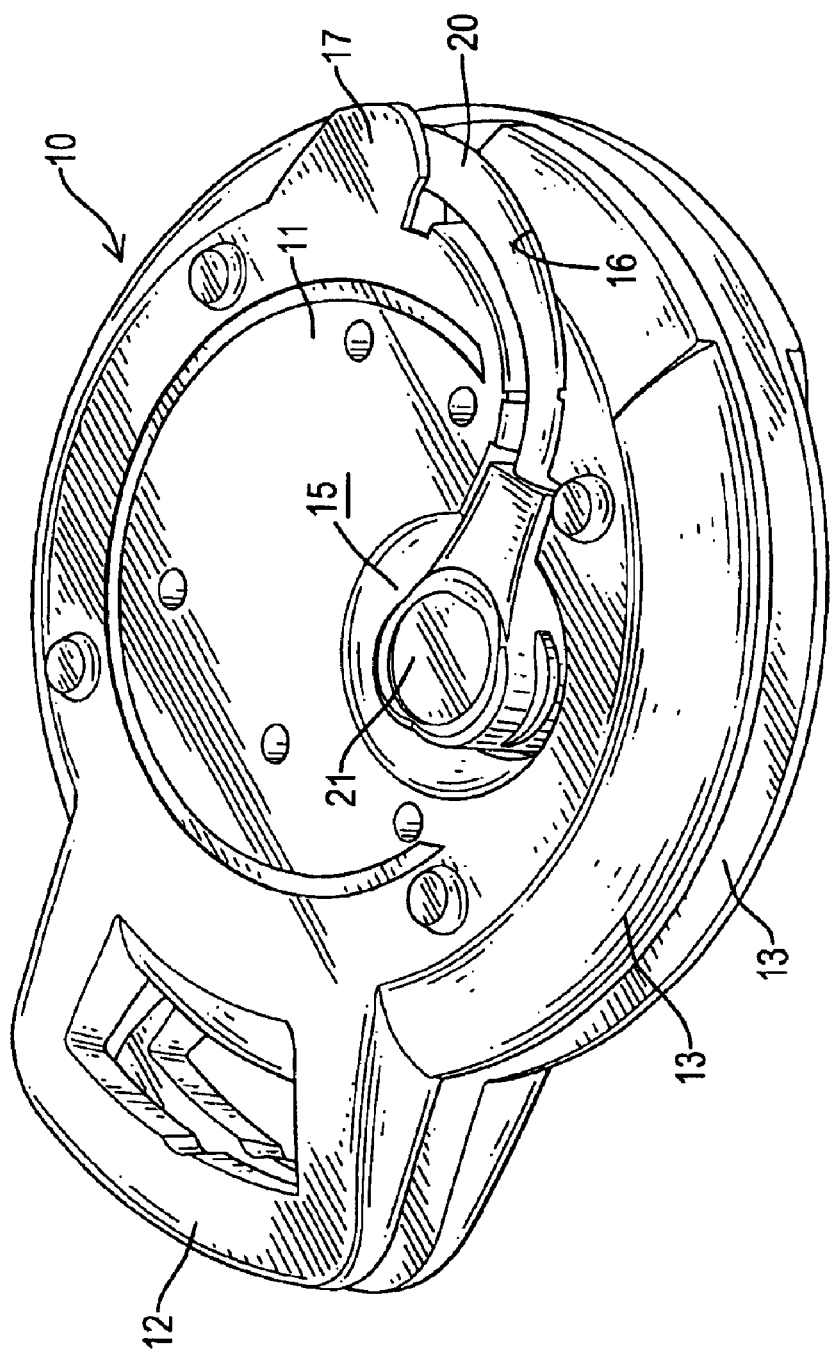
FIG. 1 is a bottom perspective view of a retractable extension cord housing in accordance with the present invention.
Figure 2:
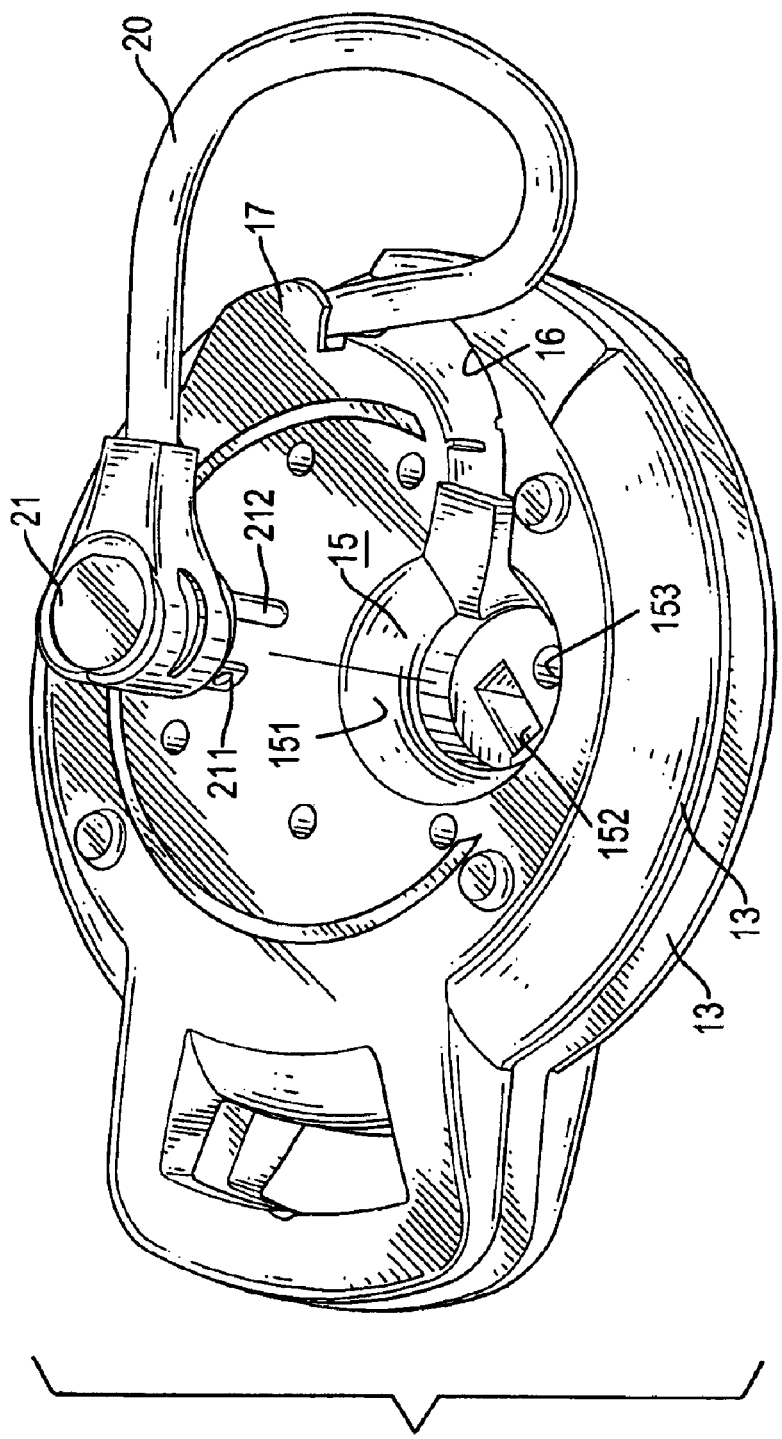
FIG. 2 is a partially exploded bottom perspective view of the extension cord housing in FIG. 1.

With reference to FIGS. 1 and 2, a retractable extension cord housing (10) having a low-profile plug holder (not numbered) in accordance with the present invention comprises a hollow body (11) that retractably holds an extension cord (20). The hollow body (11) has a top, a bottom, an external surface (not numbered), an outer edge (not numbered), an optional handle (12) and two half shells (13). The optional handle (12) is formed on the outer edge. The half shells (13) are connected to each other to form the hollow body (11) such that the extension cord (20) is retractably mounted in the hollow body (11).

The extension cord (20) has a proximal end (not numbered), a distal end (not numbered) and a low-profile plug (21) and is retractably mounted in the hollow body (11). The proximal end is securely attached to the hollow body (11), and the low-profile plug (21) has two conducting prongs (211) and a grounding prong (212), is attached to the distal end outside the hollow body (11) and is selectively mounted in the plug holder. The prongs (211, 212) selectively connect electrically to an electrical outlet (not shown). The two conducting prongs (211) are separated by a distance from each other. The grounding prong (212) is conventionally circular and has an outside diameter.

The plug holder is defined in the bottom external surface of the hollow body (11) and comprises a plug recess (15), a cord groove (16) and optionally a retaining tab (17). The plug recess (15) is defined in the external surface of one of the half shells (13) and has a tapered top opening (151), a bottom (not numbered), a rectangular hole (152) and a circular hole (153). The rectangular hole (152) is formed in the bottom of the plug recess (15) and has a length that is slightly shorter than the distance between the two conducting prongs (211). The circular hole (153) is also formed in the bottom of the plug recess (15) and has an inside diameter that is larger than the outside diameter of the grounding prong (212).

The cord groove (16) is curved and is formed in the bottom external surface of the hollow body (11) between the plug recess (15) and the outer edge of the hollow body (11) of the housing (10). The retaining tab (17) is optionally formed on the outer edge of the hollow body (11) of the housing (10) near the cord groove (16) to hold the cord (20) in the groove (16).

To mount the low-profile plug (21) in the plug holder, a portion of the cord (20) that extends outside the housing (10) is placed in the cord groove (16). The conducting prongs (211) and the grounding prong (212) of the low-profile plug (21) are pressed respectively into the rectangular hole (152) and the circular hole (153) so the low-profile plug (21) will be held in the plug recess (15).

Consequently, since the conducting prongs (211) are jammed into rectangular hole (152), the low-profile plug (20) is firmly held in the plug recess (15), is flush with the bottom external surface of the hollow body (11) and is hidden in the plug recess (15). The appearance of the retractable extension cord housing (10) as a whole is neat and clean. The tapered top opening (151) in the plug recess (15) causes an annular gap (not numbered) to be formed around the low-profile plug (20) when the low-profile plug (20) is inserted into the plug recess (15). The annular gap allows a person to conveniently grasp and remove the low-profile plug (20) from the plug recess (15).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. A retractable extension cord housing having a low-profile plug holder to retractably hold an extension cord that has a proximal end retracted into the extension cord housing, a distal end and a selectively concealable low-profile plug connected to the distal end of the extension cord and having two conducting prongs separated by a distance and a grounding prong with an outside diameter, and the extension cord housing comprising:

a hollow body having a top, a bottom, an external surface and an outer edge; and a low-profile plug holder having a non-electrically conductive plug recess defined in the bottom external surface of the hollow body and the plug recess having a tapered top opening;

a bottom;

a rectangular hole formed in the bottom of the plug recess and having a length that is slightly shorter than the distance between the two conducting prongs on the low-profile plug;

a circular hole formed in the bottom of the plug recess and having an inside diameter that is larger than the outside diameter of the grounding prong; and a cord groove arcuately formed in the bottom external surface of the hollow body between the plug recess and the outer edge of the hollow body.

2. The retractable extension cord housing as claimed in claim 1, wherein the hollow body comprises two half shells connected to each other, and the plug holder is formed in one of the half shells.

3. The retractable extension cord housing as claimed in claim 2, wherein a handle is formed on the outer edge of the hollow body.

4. The retractable extension cord housing as claimed in claim 3, wherein the plug holder further has a retaining tab formed on the outer edge of the hollow body of the housing near the cord groove to hold the extension cord in the cord groove.

* * * * *